United States Patent
Reisz et al.

(10) Patent No.: US 6,716,032 B2
(45) Date of Patent: Apr. 6, 2004

(54) SYSTEM AND METHOD OF CORRELATING LEVELING CRITERIA TO LABEL LEVELED READING BOOKS

(76) Inventors: Edwin C. Reisz, 1707 Bridgewater Dr., Heathrow, FL (US) 32746; Jeffrey R. Brake, 1438 Bristol Park Pl., Heathrow, FL (US) 32746

( * ) Notice: Subject to any disclaimer, the term of this patent is extended or adjusted under 35 U.S.C. 154(b) by 234 days.

(21) Appl. No.: 10/073,530

(22) Filed: Feb. 11, 2002

(65) Prior Publication Data

US 2003/0152895 A1 Aug. 14, 2003

(51) Int. Cl.[7] ............................... G09B 17/00
(52) U.S. Cl. ........................ 434/178; 434/169
(58) Field of Search ................. 434/118, 169, 434/362, 365, 178; 400/88, 103; 700/83, 216; 704/178; 705/74; 707/6; 725/1, 6; 382/209; 235/375

(56) References Cited

U.S. PATENT DOCUMENTS

| | | | |
|---|---|---|---|
| 3,680,229 A | 8/1972 | Serrie et al. | |
| 5,267,800 A | * 12/1993 | Petteruti et al. | 400/88 |
| 5,564,841 A | * 10/1996 | Austin et al. | 400/103 |
| 5,754,938 A | * 5/1998 | Herz et al. | 725/116 |
| 5,873,055 A | 2/1999 | Okunishi | |
| 5,901,246 A | * 5/1999 | Hoffberg et al. | 382/209 |
| 5,957,693 A | 9/1999 | Panec | |
| 6,212,358 B1 | 4/2001 | Ho et al. | |
| 6,317,648 B1 | * 11/2001 | Sleep et al. | 700/216 |
| 6,640,145 B2 | * 10/2003 | Hoffberg et al. | 700/83 |
| 2003/0155413 | * 8/2003 | Kovesdi et al. | 235/375 |

* cited by examiner

Primary Examiner—Joe H. Cheng
(74) Attorney, Agent, or Firm—Allen, Dyer, Doppelt, Milbrath & Gilchrist, P.A.

(57) ABSTRACT

A system and method of correlating book leveling criteria to label leveled reading books is disclosed. An instructional reading level of a selected book leveling method is input into a data entry field of a graphical user interface such as at a personal computer or other processor. This instructional reading level is correlated with instructional reading levels of other book leveling methods to produce correlated instructional reading levels. One or more correlated instructional reading levels are selected to be printed on a label for application onto a reading book.

18 Claims, 7 Drawing Sheets

| THE A.L.L. CHART |||||  |
|---|---|---|---|---|---|
| GRADE LEVEL | DRA LEVEL | F&P LEVEL | READING RECOVERY | STAGES OF DEVELOPMENT | |
| KINDERGARTEN | 1<br>2 | A<br>B | 1<br>2 | EMERGENT<br>(A,B,C)* | GREEN |
| GRADE ONE | 3-4<br>4-6<br>6-8<br>10<br>12<br>14<br>16 | C<br>D<br>E<br>F<br>G<br>H<br>I | 3-4<br>5-6<br>7-8<br>9-10<br>11-12<br>13-14<br>15-16 | EARLY<br>(C,D,E,F,G,H,I)* | RED |
| GRADE TWO | 18<br>20<br>24<br>28 | J<br>K<br>L<br>M | 17-18<br>19-20<br>N/A<br>N/A | EARLY FLUENT<br>(I,J,K,L,M)* | PURPLE |
| GRADE THREE<br><br>GRADE FOUR<br><br>GRADE FIVE<br><br><br><br><br>GRADE SIX | 30<br>34<br>38<br>40<br>40<br>44<br>44<br>N/A<br>N/A<br>N/A<br>N/A<br>N/A<br>N/A | N<br>O<br>P<br>Q<br>R<br>S<br>T<br>U<br>V<br>W<br>X<br>Y<br>Z | N/A<br>N/A<br>N/A<br>N/A<br>N/A<br>N/A<br>N/A<br>N/A<br>N/A<br>N/A<br>N/A<br>N/A<br>N/A | FLUENT<br>(M,N,O,P,Q,R,S<br>T,U,V,W,X,Y,Z)* | YELLOW |

*FIG. 1A.*

SYSTEM AND METHOD OF CORRELATING LEVELING CRITERIA TO LABEL LEVELED READING BOOKS

FIELD OF THE INVENTION

This invention relates to the field of the book leveling methods, and more particularly, this invention relates to book leveling criteria used to label leveled reading books.

BACKGROUND OF THE INVENTION

It is well known that learning to read is a developmental process where students pass through developmental stages at their own rate as compared to others in the same grade group and classroom environment. There are, however, some generalizations that can be made about different reading levels for students at these early stages at around kindergarten levels and passing through upper emergent, early fluency and fluency levels at grades 3–5. For example, most students entering the first grade from a kindergarten and pre-primer level read at a reading level of A–C on a Fountas & Pennell (F&P) level, about 1–4 on a Reading Recovery® level, and A-1 through 4 on a Developmental Reading Assessment (DRA) level for these corresponding book leveling methods. These different book leveling methods have been formulated by teachers, instructors and others skilled in the art to assist them in determining various reading strategies for individuals and/or groups of students. Thousands of reading books and other instructional books in a reading library have been leveled to aid teachers and instructors in selecting what books should be chosen for reading assignments by particular individuals, classroom groups or other instructional groups using a reading library.

These book leveling methods include the well known Reading Recovery®, Fountas & Pennell (F&P), and Developmental Reading Assessment (DRA) book leveling methods. One of the better known methods is the Fountas & Pennell book leveling method. Details of that particular book leveling method can be found in two well known textbooks entitled, *Matching Books to Readers: Using Leveled Books in Guided Reading, K-3*, Heinemann, 1999, and *Guided Reading: Good First Teaching for All Children*, Heinemann, 1996. Another well known textbook is *Developmental Reading Assessment Resources Guide*, Celebration Press, 1997.

In one prior art attempt to match a student's reading level to a particular book readability, U.S. Pat. No. 3,680,229 to Serrie et al. discloses the use of two series of distinctive corresponding symbols. One of the series of symbols is assigned to a student on the basis of a student's reading level. The second series of symbols is assigned as based on reading difficulty. Identical symbols of the two series indicates that a particular book meets the reading level of a student. This provides some correlation for matching reading levels of individual students from primary grade level up to junior high school grade levels with the reading difficult of library books, text and the like. This allows an individual student to select, read and comprehend books of different complexity to match their current reading and comprehension abilities. This system provides some control over the use of one particular leveling method, if chosen, relative to the reading system.

One of the drawbacks of current leveling methods, however, is the large number of commercially available leveling methods as described above. Often, one set of books might be leveled using one book leveling method and another set of books may be leveled using a second book leveling method. Thus, a teacher or instructor would be required to consult different book leveling lists to determine which instructional reading level corresponded to a particular book. Also, a teacher or instructor would have to consult a leveling correlation table when a book that had been leveled using one book leveling method was compared to another book that had been leveled using a second or even a third book leveling method. This creates much hardship to the teacher or instructor. Also, some libraries have thousands of books and it is a great burden to determine at what level each book is categorized, let alone know the instructional reading level of a book at different book leveling methods.

SUMMARY OF THE INVENTION

The present invention advantageously provides a system and method of correlating leveling criteria to label leveled reading books in a manner that is efficient and inexpensive without resorting to time consuming leveling correlation tables and/or different leveling charts and lists that display a large number of books. The system includes a computer with a data input, such as a keyboard and mouse, and a printer for printing label sheets either in black and white or in color. In the system and method of the present invention, the instructional reading level of a selected book leveling method is input into a data entry field of a user interface. A processor correlates the instructional reading level that has been input with the instructional reading levels of other book leveling methods contained in a data store to produce correlated instructional reading levels. A user can select one or more correlated instructional reading levels for printing on a label for application onto a reading book.

In one aspect of the present invention, the instructional reading level can be input by accessing a drop down menu and selecting an instructional reading level. A background color corresponding to a label color to be printed based on the selected instructional reading levels can be user selected and displayed as a background on the user interface. Custom data can be input to be printed on each label. This custom data can include such information as the name of the school, use of other leveling methods, clarification of leveling methods, and related information. This custom data can be maintained even after changing instructional reading levels to be printed on labels. It is also possible to select a row and column for printing labels on prearranged label sheets.

A user interface is also displayed for correlating book leveling criteria to label leveled reading books. The user interface includes a label section for displaying correlated instructional reading levels of predetermined book leveling methods. A search section allows entry of instructional reading levels to be correlated.

BRIEF DESCRIPTION OF THE DRAWINGS

Other objects, features and advantages of the present invention will become apparent from the detailed description of the invention which follows, when considered in light of the accompanying drawings in which:

FIG. 1A is an example of a color coded poster that can be used to assist teachers in the use of the present invention.

DETAILED DESCRIPTION OF THE PREFERRED EMBODIMENTS

Figure 1:
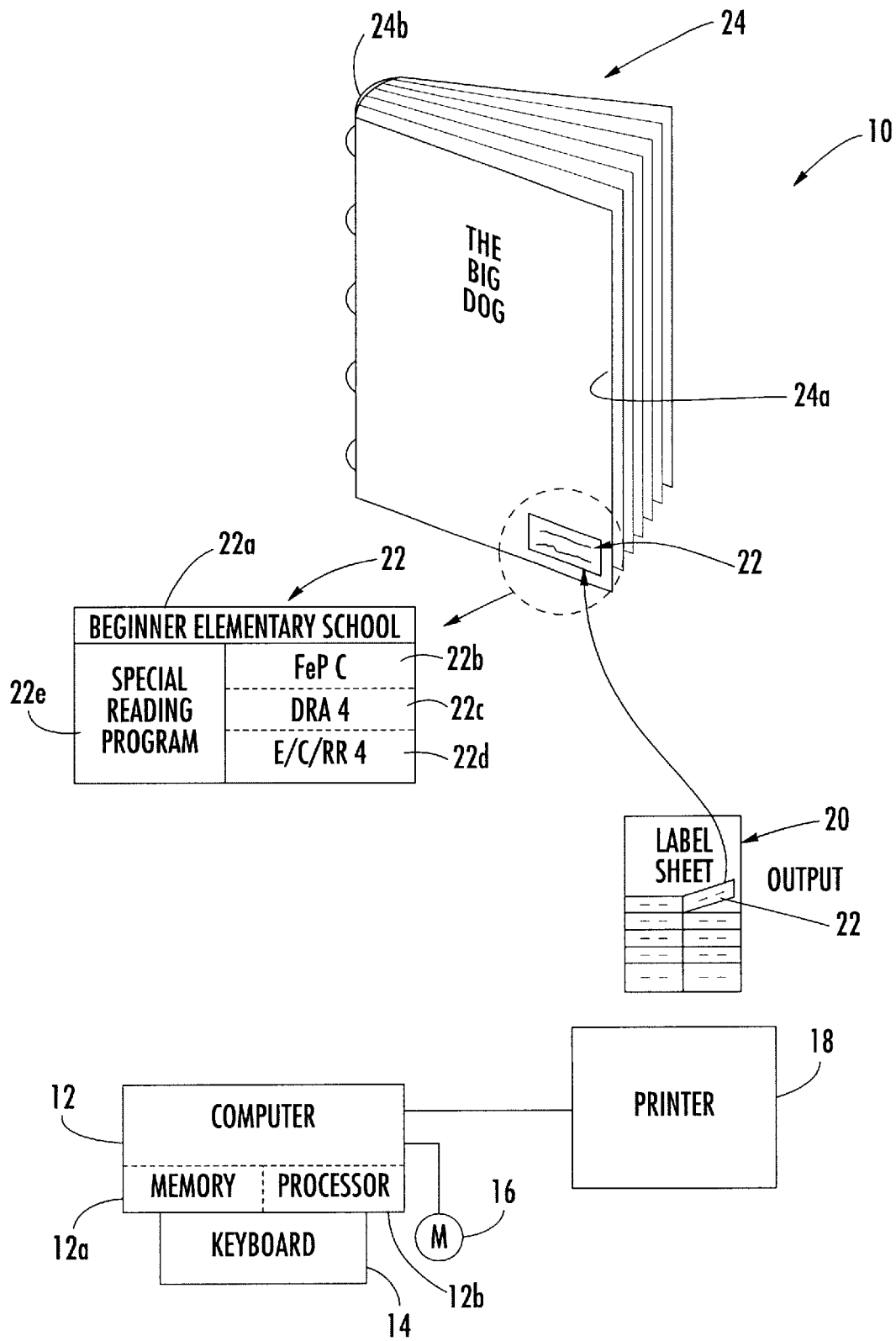
FIG. 1 is a fragmentary block diagram of the system for correlating book leveling criteria to label leveled reading books and showing a computer, printer and book having a label applied in accordance with the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The present invention advantageously overcomes the disadvantages of prior art book leveling methods and systems and allows the correlation of book leveling criteria to label leveled reading books of a reading library in an efficient and inexpensive manner. As noted before, reading books and other instructional books can be leveled by different book leveling methods, including the Early Intervention Level/Reading Recovery® (EIL/RR), Fountas & Pennell (F&P), and Developmental Reading Assessment (DRA) book leveling methods. Different numerical or letter values are assigned to leveled books by the different book leveling methods as illustrated in the book leveling correlation Table I below, which is set forth as a non-limiting example for grade leveling approximations:

TABLE I

| Grade Level | Reading Recovery ® Level | Fountas & Pennell Level | Developmental Reading Assessment Level |
|---|---|---|---|
| Kindergarten | 1 | A | A-1 |
|  | 2 | B | 2 |
| Pre-Primer | 3 | C | 2 |
|  | 4 | C | 3–4 |
|  | 5–6 | D | 5–6 |
|  | 7–8 | E | 7–8 |
| Primer | 9–10 | F | 9–10 |
|  | 11–12 | G | 11–12 |
| Grade 1 | 13–14 | H | 13–14 |
|  | 15–17 | I | 16 |
| Grade 2 | 18 | J | 18 |
|  | 19 | J | 20 |
|  | 20 | K | 24 |
|  | 24–28 | L–M | 28 |
| Grade 3 | 30 to | N | 30 |
|  | 34 | N | 34 |
|  | 34 to | O | 38 |
|  | 38 | P | 38 |
| Grade 4 | 40 | Q | 40 |
| Grade 5 | 44 | R | 40 |

The Reading Recovery® instructional system, Fountas and Pennell instructional system, and DRA instructional system are the commonly used book leveling methods for reading libraries in most education systems. Other general categories used in book leveling methods include the use of a reading level, such as an Early Emergent stage for kindergarten and the start of pre-primer grade levels, an Upper Emergent stage for pre-primer, primer and grade 1, an Early Fluency stage for grade 2, and a Fluency stage for grades 3–5. It is also possible to use Lexile levels for systematic levels assigned to books starting at the 200 series and continuing through the 1100 series (1.5 through 8.0). A Basal level includes such levels as Readiness and other levels, known to those skilled in the art.

The present invention allows a user to input into a data entry field of a user interface in a computer system an instructional reading level of a selected book leveling method, such as Fountas & Pennell. The instructional reading level that has been input is correlated with instructional reading levels of other book leveling methods to produce correlated instructional reading levels. One or more of the correlated instructional reading levels for corresponding book leveling methods can be user selected and printed onto a label for later application onto a reading book.

The software system of the present invention permits a user to automate the creation of a leveled and color-coded collection of books and can be accomplished by non-instructional help, such as volunteers, clerks, grandparents, Dividends, and other associated people. The system software advantageously permits a user to input only one of the three most popular leveling systems and the software system automatically researches, correlates and lists the equivalent levels from the other two systems. A user inputs how many books the user wants labeled, hits a print key, and the system begins printing the levels and any other information that the school or user chooses on color-coded labels.

FIG. 1A illustrates a poster showing a table that can be used in conjunction with the system as an aid to a teacher or other user. The posters for the reading resource rooms and the individual lesson plan charts for each teacher are a valuable tool for schools that use the system software of the present invention. The grade-level approximations that the charts give, the visual color clues that are built-in to the charts, and the correlations between leveling systems are advantageous instructional tools for teachers in the typical grades of kindergarten through fifth grade. As schools move toward the purchasing and leveling of more intermediate texts, the software system makes it easy to introduce to third, fourth and fifth grade teachers the instructional advantages of level texts. This system is advantageous for the users and various educational publishers.

It is also possible that a module could be placed in the system such that a teacher could use an Excel spreadsheet and download it into a database of the system for further enhancements and instructional uses.

FIG. 1 illustrates a fragmentary block diagram of the system 10 of the present invention showing a computer 12, which could be a personal computer used by teachers or instructors either at home or school. The computer 12 could be a main frame computer, minicomputer, personal computer or other processor known to those skilled in the art. The computer 12 includes a memory 12a and processor 12b as is conventional. The memory 12a contains instructional reading levels of predetermined book leveling methods. The processor 12b receives an instructional reading level of a selected book leveling method and correlates this level with other book leveling methods.

The computer 12 includes a standard keyboard 14 and mouse input 16, as known to those skilled in the art. The computer is connected to a printer 18, preferably a color printer, which can print label sheets that typically have 30 labels per sheet, such as in two columns and 15 rows. A printed label sheet 20 is output from the printer 18 and, as illustrated, a single label 22 is removed from the label sheet 20 and applied onto the illustrated instructional book 24, as an example. Although the label is shown as applied onto the front book cover 24a, it can also be applied onto the binding edge 24b of the book, such that when the book rests on a bookshelf, a teacher can immediately see the label. Two or more labels 22 can also be applied onto a book as may be desired by one skilled in the art.

The label as illustrated includes a general information field 22a, such as the name of the school, three different book leveling fields 22b, 22c and 22d for three different book leveling systems, including the Reading Recovery® system, Fountas and Pennell system, and DRA system. Another custom data field 22e includes information about titles, reading programs, or other selected information. Other information can include the reading level, such as an "Early Reader," a basal level, such as Pre-Primer, and a grade level, such as kindergarten/early first grade. Naturally, the particular layout of a label can be designed according to any specification desired by one skilled in the art, and the illustrated label shown in FIG. 1 is only one non-limiting example to show what type of information can be printed on a label and applied onto a reading book.

Figure 2:
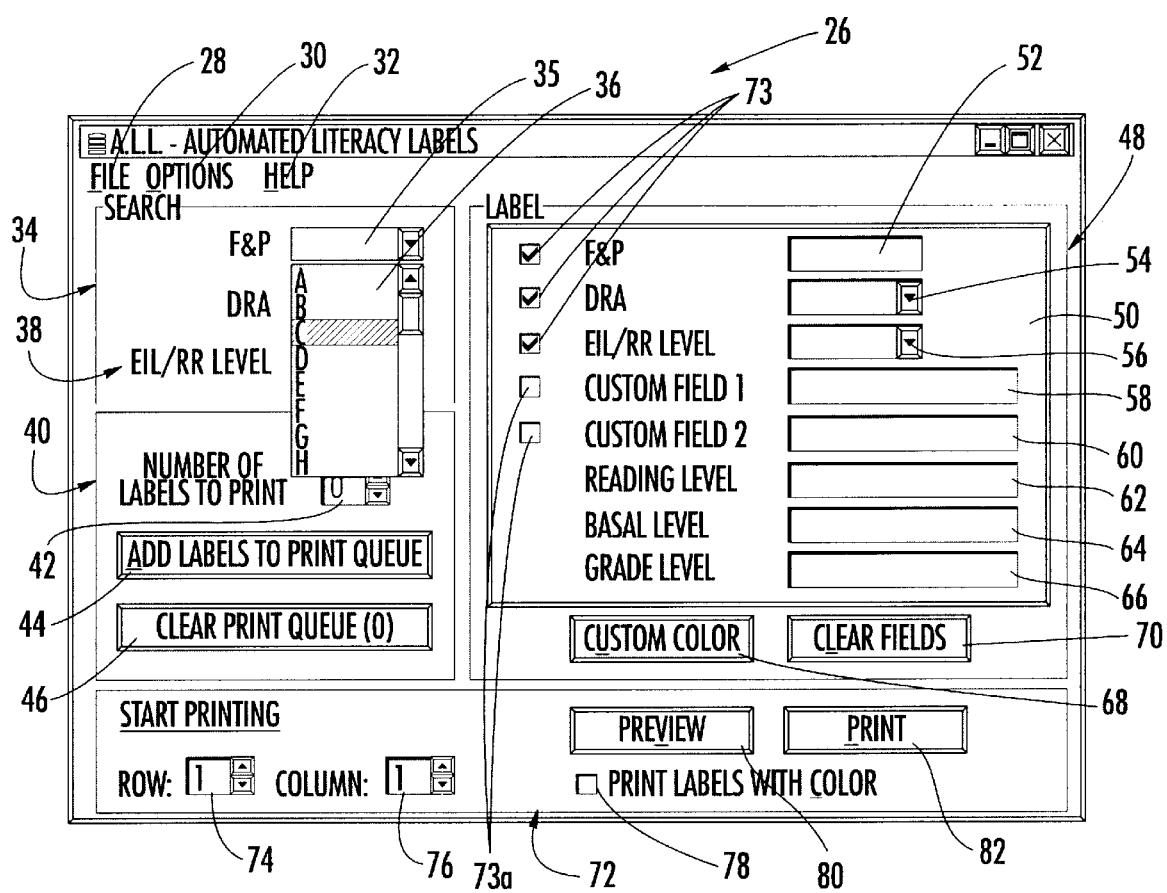
FIGS. 2–6 are examples of open user interface windows showing different sequences in the method and system of correlating book leveling criteria to label leveled reading books.
Figure 3:
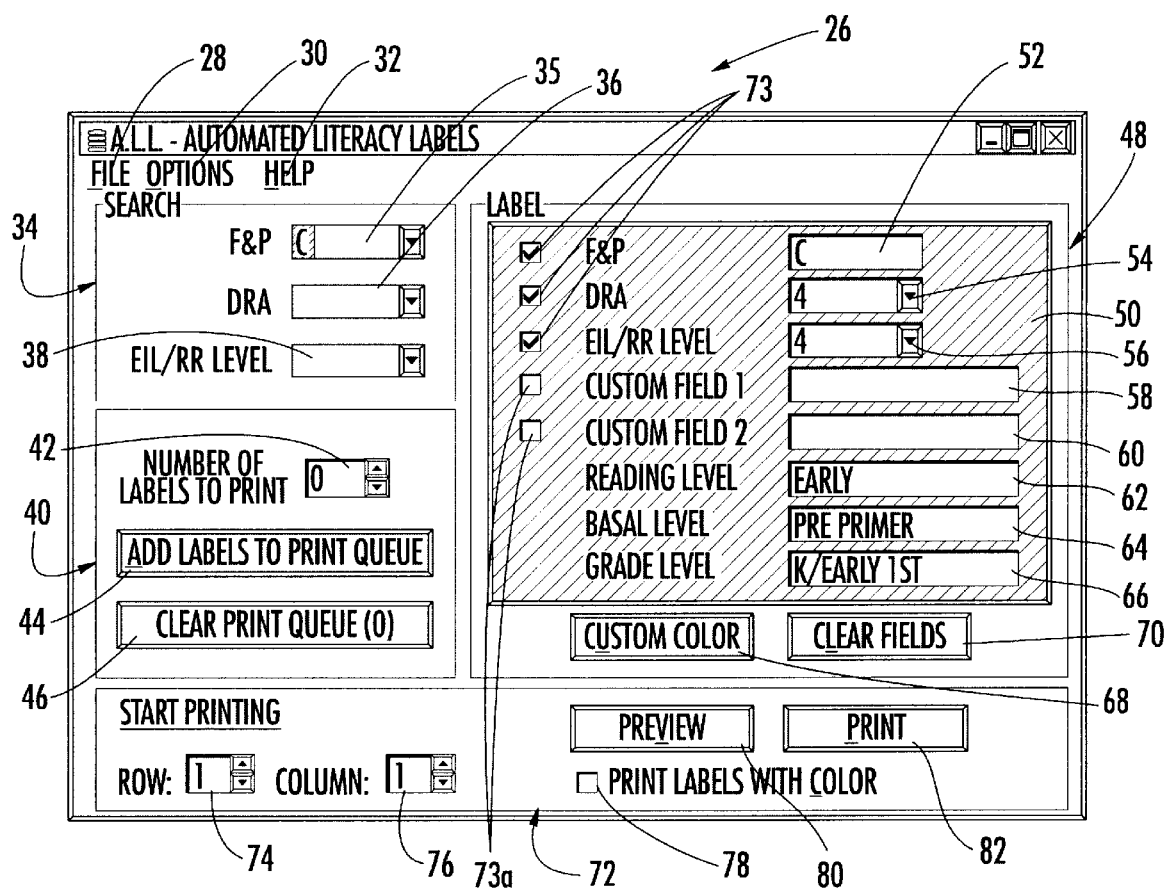
Figure 4:
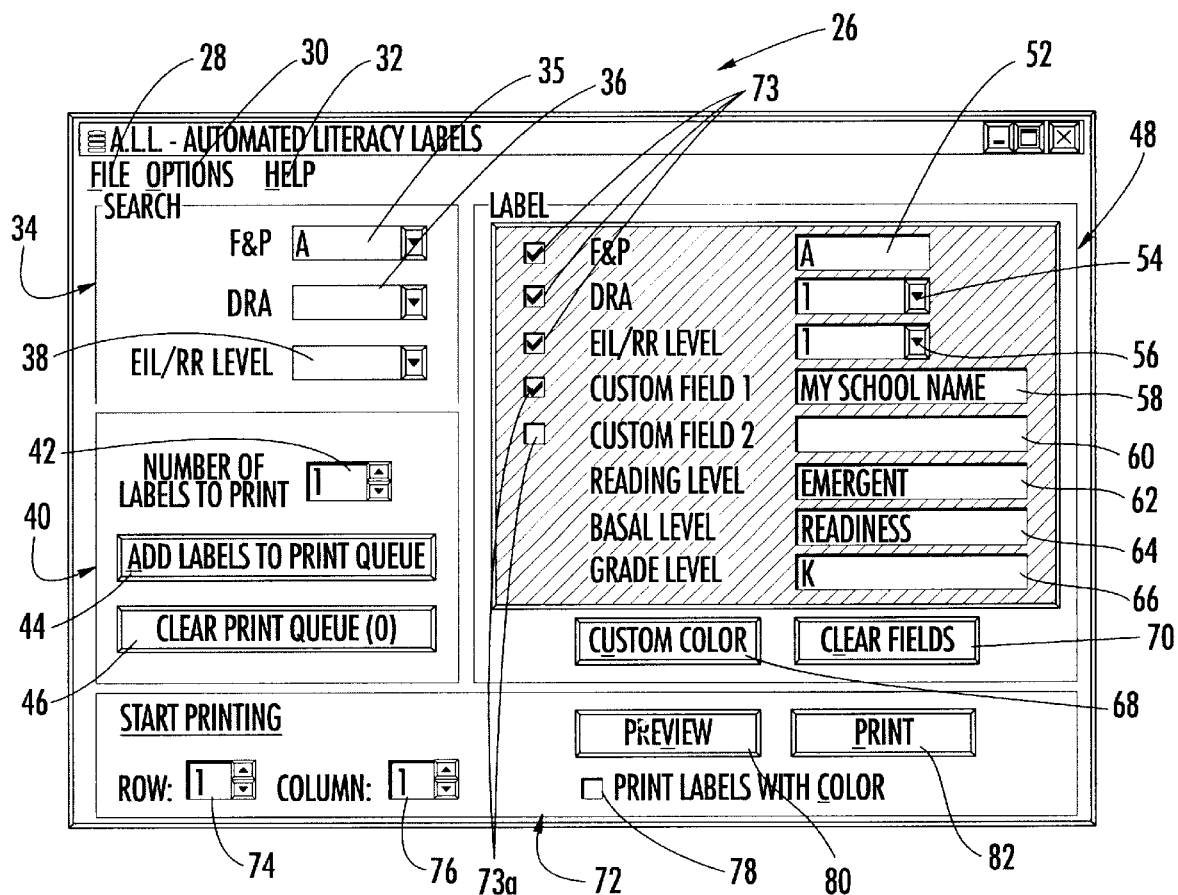
Figure 5:
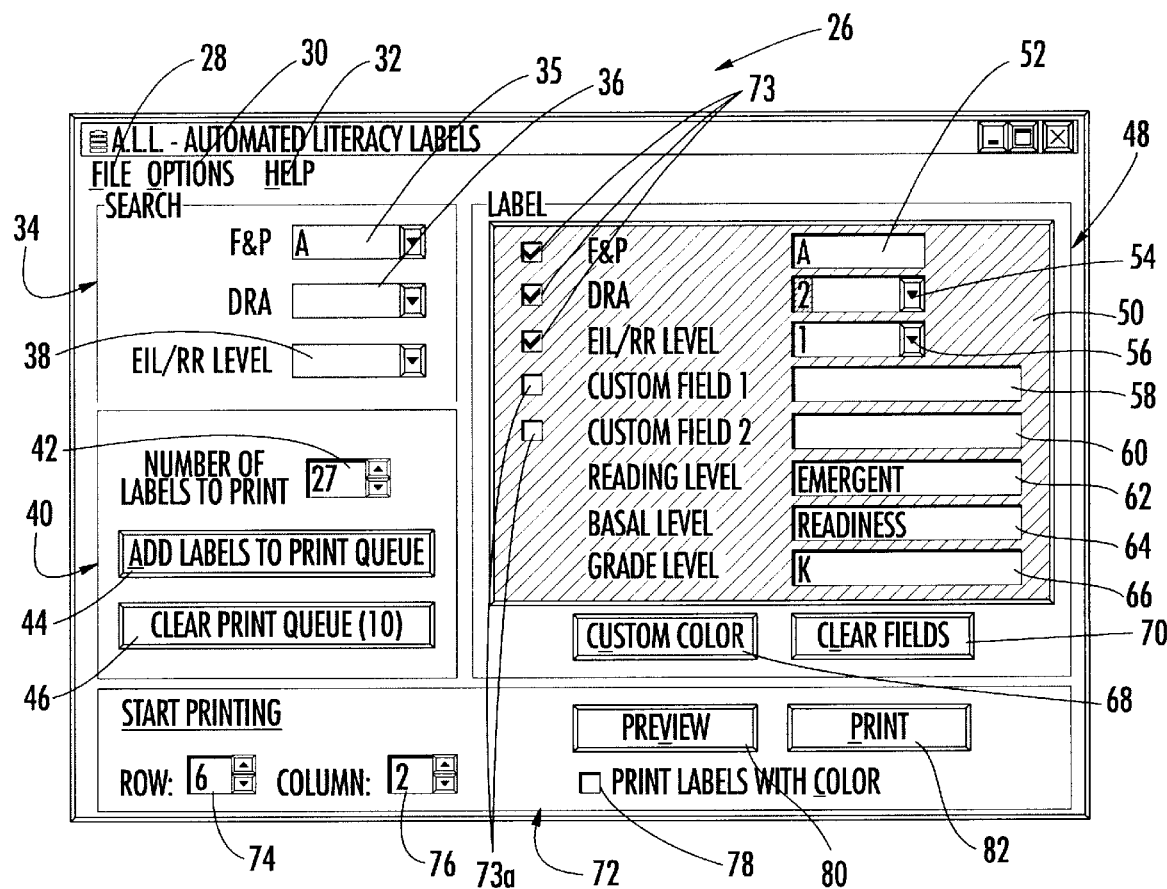
Figure 6:
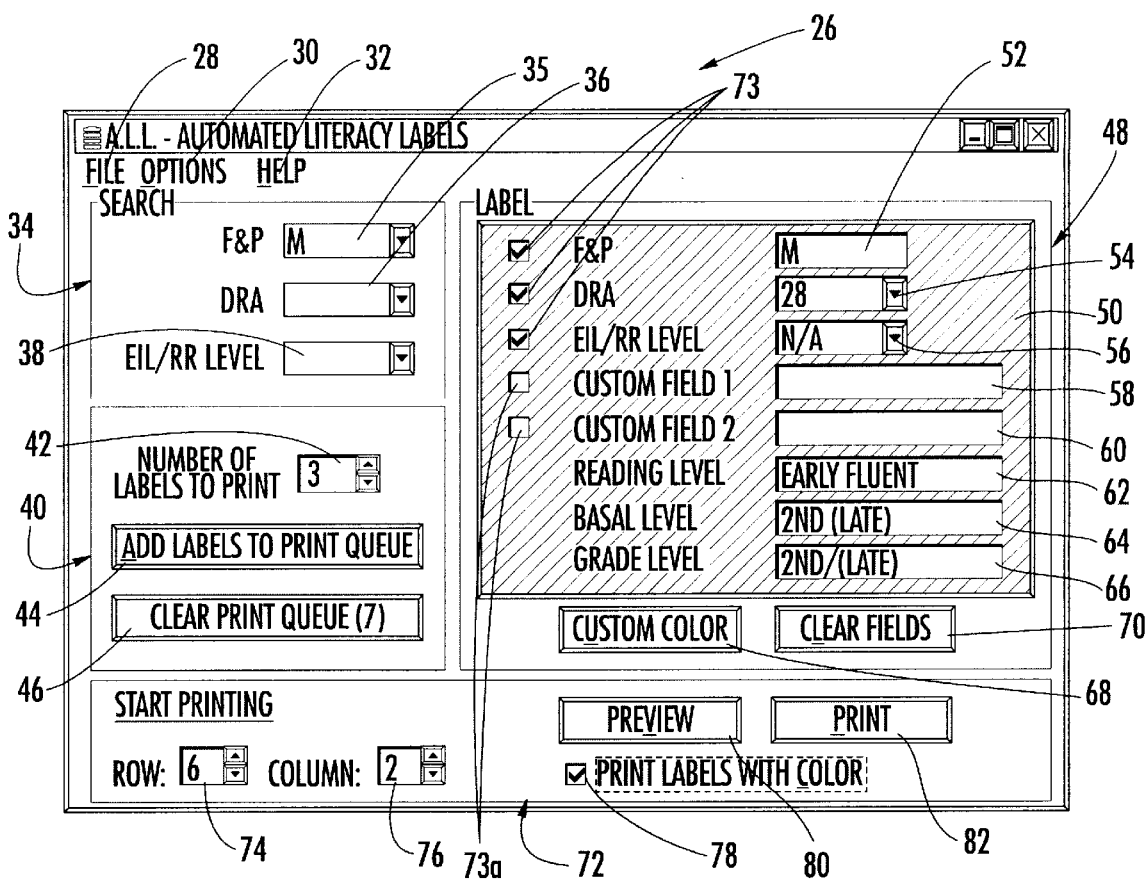

FIG. 2 illustrates an open window for a user interface 26 of the present invention that is viewed by the user on a computer screen or other display. The user interface 26 is operable with the conventional windows operating system and includes the conventional file 28, options 30 and help 32 drop down menu options located at the upper left corner of the open window. A search section 74 of the open window includes three data entry fields for the listed book leveling methods as pull down menus, a Reading Recovery® drop down menu 35, a Fountas and Pennell drop down menu 36, and a DRA drop down menu 38. A print section 40 below the search section 34 includes a counter box 42 that can be incremented for indicating the number of labels to print, including a button 44 to Add Labels To Print Queue and a button 46 to Clear Print Queue.

The right-hand portion of the open window for the user interface includes a label section 48 having a background 50 that is preferably color coded and includes a data field box 52 for the F&P level and drop down menus for the DRA level 54 and the Reading Recovery® level 56. Any data input for reading levels onto the Search section 34 of the open window through the drop down menus 35, 36 or 38 will automatically display a book level in the Fountas and Pennell (F&P) data field box 52 in one non-limiting example of the present invention. Correlated reading level values are displayed in the other boxes and menus.

A first custom field data line box 58 and a second custom field data line 60 are included to allow custom data entry. A reading level field 62, basal level field 64 and grade level field 66 are included. Custom color buttons 68 and Clear Field buttons 70 are included. Check boxes 73 allow selection and deselection of the different leveling systems as explained further.

The lower portion of the upper window includes a Start Printing section 72 that includes a counter box 74 for a label row and a counter box 78 for the label column, corresponding to the rows and columns of a normal label sheet to be printed. A data entry box 78 for printing labels with color can be selected or deselected to allow printing in black and white or color. A preview button 80 can be selected to preview what is to be printed and a print button 82 selected for completing the printing.

A more detailed description of the installation and method of operation of the system and method of the present invention using the user interface 26 as described above is now set forth in detail relative to FIGS. 2–6.

A user first inserts a CD containing the appropriate software in the appropriate drive of a personal computer 12 or other device. From the windows mein menu, a user clicks on the start icon in the lower left-hand corner of the main screen and selects Run. The user types in the drive for the CD if the system failed to do so automatically. The setup file is selected by clicking on browse if it is not already showing in the file box. The user selects setup or clicks OK. This will install the labeling system of the present invention onto the hard drive. The user follows a normal sequence of prompts through the setup process to completion. The setup program will create a shortcut icon on the desktop.

Once the system software is installed, a user clicks on an icon that the start up program has installed on the Windows desktop during the setup. If a user is unable to locate the icon on the desktop, the start button on the Windows taskbar is clicked and the user looks in the program listing to find the program titled Automated Literacy Labels. The program is started by clicking on an icon "Labels." Once the program is up and running, an opening page credits the source of the most popular book leveling systems used by literacy experts nationally. A user clicks on the box to continue to the main screen of the system.

The labeling process of the present invention begins by selecting an instructional reading level in only one of the fields and drop down menus 35, 36 and 38 in the "Search" section 34 and titled F&P, DRA or EIL/RR as illustrated. This is accomplished by clicking on the arrow that accesses the drop down menu. Once a user selects a level on the drop down menu, the closest corresponding level in the other fields is automatically inserted. The user can continue to change the selection in this section until one has the basic requirements for a label printing job. Once the search level is complete, one moves over to the next section 48, titled "Label." The "Label" box or section 48 will contain the background color on which the label is to be printed and the corresponding instructional reading levels for F&P, DRA and EIL/RR as illustrated.

In this particular non-limiting example, F&P, DRA and EIL/RR are the only levels that can be printed onto labels. One can show all three levels on labels or omit them to suit the needs by selecting or deselecting these levels with the check mark box 73 next to the corresponding level.

Initially, all three levels are automatically selected to print onto labels. If the box 73 is "checked" next to the corresponding level, this indicates that it will be printed onto labels. Once the label is filled in the manner a user desires, the print process begins. If the levels on the label need adjustment, it is at this point in the process that one is able to exercise their discretion and adjust the levels on the label.

The system is designed to allow the adjustment of the DRA and EIL/RR levels as they relate to the F&P level in order to meet the criteria as an educator. The drop down menu arrows in the windows 54 and 56 of the DRA and EIL/RR levels allow one to make these adjustments. Naturally, one leveling criteria is not superior and should not have preference over another. The F&P level is chosen only to establish one level as a base to work from when selecting colors for the labels to create consistency. The color of the label is keyed to the F&P level in this particular non-limiting example. Other levels do not have to be adjusted to move into a level that would be in another color. A user can always check a leveling correlation guide to ensure that they have not made too great an adjustment. In this example, the color of the label can only be selected or changed in the previous "Search" section 34. If a user requires adjustments to the extent that the adjustments will cause a change in the color of the label, a user selects another level in the "Search" section 34 in order to maintain colors and levels consistent.

The three additional windows 62, 64 and 66 in this section that show "Reading Level," "Basal Level," and "Grade Level" and are for reference only. These levels are typically not printed. Many educators often prefer that these levels or explanations not be shown on any books and are, thus, not applied to labels.

The custom fields 58, 60 are used to place additional data onto labels. The user inserts school personal data or another leveling system that is not integrated into the program onto labels through the use of the two custom fields. To insert custom data on the label, a user checks the box 73a next to one or both of the custom fields, mouse clicks the cursor in the empty data field and types in the data to be inserted.

The system 10 is designed to allow a user to insert data in the custom fields 58, 60 and have that data continue to insert on all labels until the user removes it. This feature is helpful when data in the custom field is desired on every printed label. For example, the school name or a special reading program title on every label could be printed. A user can perform multiple searches and create multiple labels and the custom field data will continue to print on your labels.

The custom field data will always remain on all of the labels one creates until such time that one removes it by clicking on the "Clear Fields" button 70. One can change the data in the custom field box at any time by dragging over the text and typing in new text.

The desired labels can now be printed. The system allows flexibility in printing a current label job. There are two ways to approach the printing of labels depending on these factors:

how many labels to be printed;
how many colors to be printed;
how many labels of each color to be printed.

A user tailors the label printing to each specific need. If a color printer is not available, one uses a print process A and uses pre-colored label sheets. White labels can be used with a color printer and the steps in print process B are followed when any of the following situations exist:

a color printer is available and one has a print job of just a few labels per color; and
multiple colors are to be printed and a total number of labels in all of less than 30.

Using white labels and a color printer to color code the labels could become expensive. If one prints a large number of labels in this format, one will be required to make frequent changes to the color ink jet or toner cartridges. In addition, labels made in this format may not be as colorfast as the pre-colored label sheets. Naturally, a combination of printing processes A and B could be used as suggested by those skilled in the art.

Print process A can be used when printing labels on pre-colored label sheets without the use of color from the printer. If one intends to create more than just a few labels, then one can use the print process outlined below to create and print one colored set of labels at a time.

Once one has searched and edited the label to meet the leveling and printing criteria, a user selects the number of individual labels to be printed. This can begin by moving the cursor to the counter box 42 titled Number of Labels to Print. The appropriate number of labels one desires to print is selected by typing the number in the box or using the mouse to activate the up or down arrows to make the selection. Once one has selected the number of labels to print, the user clicks on the box 44 titled Add Labels To Print Queue. The print queue collects completed label printing jobs that are not to be printed separately. For example, labels can be printed such as when printing different levels on labels that share the same label color.

If one has more labels of the same color to create, the process begins over to create those labels. The number of labels to be printed is selected and those labels added to the print queue in the same way. This process is repeated as often as needed until all of your labels to be printed of the same color have been created and stored in the print queue.

The user selects and inserts the appropriate number and color of pre-colored label sheets in the printer, as indicated by the background color of the label one has created in the label box. In one non-limiting example, there are 30 labels on each sheet consisting of ten rows and three columns. If one has a label sheet that is partially used from a previous print job, one can select the row and column on the label sheet where the new print job is to begin. The default in the system is row 1, column 1. The system prints the first label on the appropriate row and column from the top of the page after selecting from the boxes in the Start Printing area. If the print job has multiple sheets to print, the second page will automatically begin printing on row 1, column 1. Partial sheets can only be used as the first page to print.

It is possible to preview the print job and print the labels. Once one has selected the placement of the first label on the first sheet to print, one can deselect the check mark in the box 78 titled Print Labels with Color and preview the labels by clicking on the Preview button 80. The labels will appear colorless in the preview window. No color is required in the printing process because the pre-colored label sheets are used. The Preview button 80 is closed by clicking on a Close box. This will return one to the main screen. If any changes are required at this point, it is possible to clear the print queue and start over. If the preview meets with approval, a user clicks on the Print button 82 and the labels are put back into service. The print queue is cleared and the process begun anew to create labels of a different color.

The print process B is used when printing on white label sheets and using a color printer to color the labels. The process is similar to what has been described before except the appropriate number of white label sheets to begin the printing process are inserted into a printer. The check mark is selected next to the box 78 titled "Print Labels With Color" to ensure that the labels are printed in color. Any labels that show up in the preview window by clicking on the Preview button 80 will appear in color.

Figure 7:
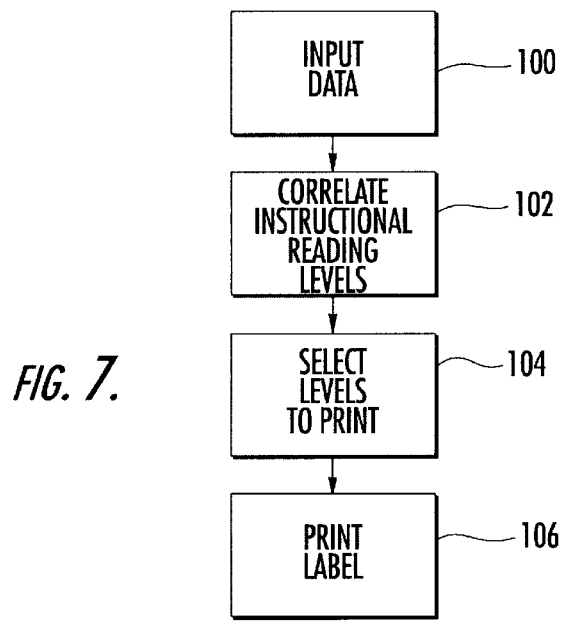
FIG. 7 is a high level flow chart of a method and system of the present invention.

FIG. 7 illustrates a high level flow chart of the basic system and method of the present invention. Data is input into a data entry field (block 100) for an instructional reading level of a selected book leveling method. The instructional reading level that has been input is correlated with instructional reading levels of other book leveling methods (block 102). One or more instructional reading levels are then selected to be printed on a label (block 104) and the label printed (block 106).

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A method of correlating leveling criteria to label leveled reading books comprising the steps of:

inputting into a processor an instructional reading level of a predetermined book leveling method;

correlating the inputted instructional reading level with instructional reading levels of other book leveling methods to produce correlated instructional reading levels; and selecting one or more correlated instructional reading levels for printing on a label to be applied onto a reading book.

2. A method according to claim 1, wherein the step of inputting an instructional reading level further comprises the step of accessing a drop down menu of a user interface for a selected book leveling method and selecting an instructional reading level for the selected book leveling method.

3. A method according to claim 1, and further comprising the step of automatically displaying a background color on a user interface corresponding to a label color to be printed based on a selected instructional reading level.

4. A method according to claim 3, and further comprising the step of selecting a desired color to be printed on a label for an instructional reading level.

5. A method according to claim 1, and further comprising the step of inputting custom data to be printed onto each label.

6. A method according to claim 5, and further comprising the step of maintaining custom data to be printed after changing instructional reading levels to be printed on labels.

7. A method according to claim 1, and further comprising the step of selecting a row and column for printing on labels at selected locations on prearranged label sheets.

8. A method according to claim 1, and further comprising the step of user selecting an option to print labels in color or black and white.

9. A system for correlating leveling criteria for leveled reading books comprising:
- a memory containing instructional reading levels of predetermined book leveling methods;
- a processor for receiving an instructional reading level of a selected book leveling method and correlating the instructional reading level with instructional reading levels of other book leveling methods contained within the memory to produce correlated instructional reading levels; and
- a user interface operative with the processor and data store for displaying the correlated instructional reading levels, wherein a user selects one or more of the correlated instructional reading levels for printing the instructional reading levels on a label to be applied onto a reading book.

10. A system according to claim 9, wherein said user interface includes a drop down menu for selecting an instructional reading level to be correlated with instructional reading levels of other book leveling methods.

11. A system according to claim 9, wherein labels are printed in one of black and white or in a color of a selected instructional reading level to be printed on a label.

12. A system according to claim 9, wherein said user interface includes a background color corresponding to a color that is printed on a label.

13. A system according to claim 9, wherein said user interface includes a custom data field into which custom data can be input for printing onto a label.

14. A system according to claim 9, wherein said user interface includes a print section having data input fields for selecting a row and column for printing labels in selected locations on prearranged label sheets.

15. A user interface that is operative with a memory having instructional reading levels in different book leveling methods and a processor for receiving and correlating instructional reading levels of the different book leveling methods to produce correlated instructional reading levels and comprising:
- a search section having a data entry field for entering an instructional reading level of a predetermined book leveling method; and
- a label section for displaying correlated instructional reading levels of different book leveling methods to be selected for printing on a label to be applied to a reading book.

16. A user interface according to claim 15, wherein said label section has a background color corresponding to a color of labels to be printed.

17. A user interface according to claim 16, wherein a color is user selected.

18. A user interface according to claim 16, wherein said label section includes custom data fields for entering custom data to be displayed on a label.

* * * * *